UNITED STATES PATENT OFFICE.

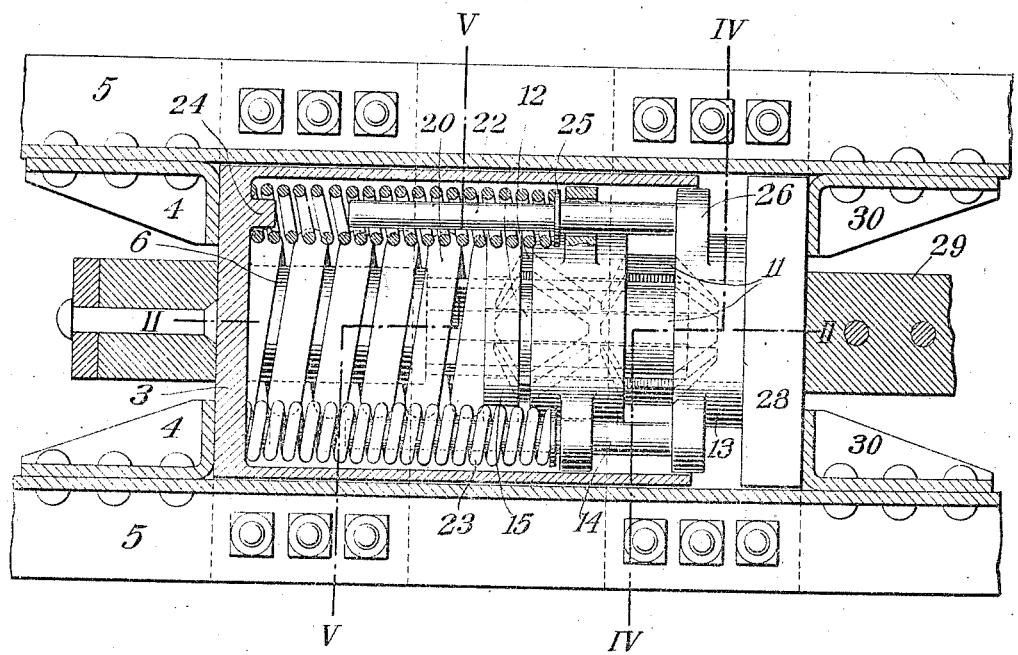
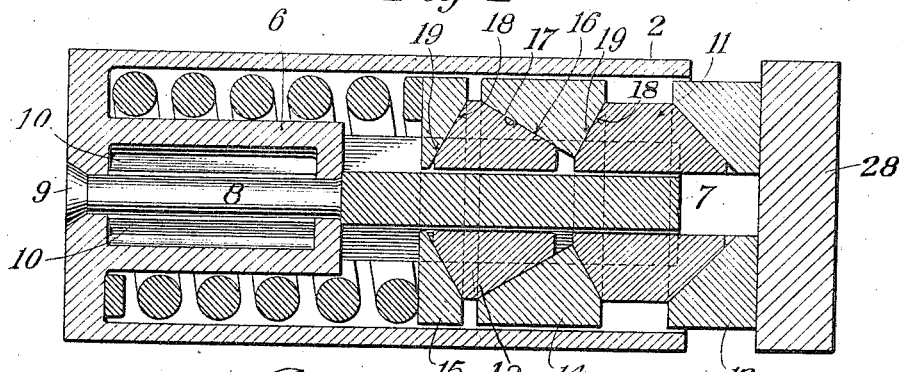
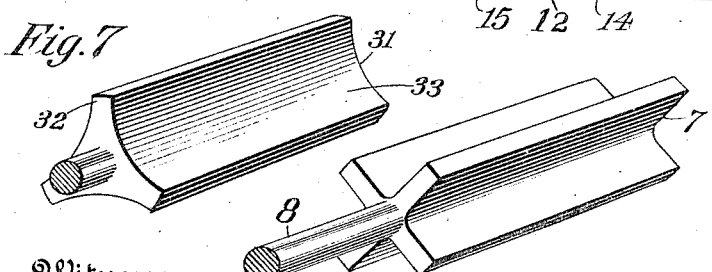

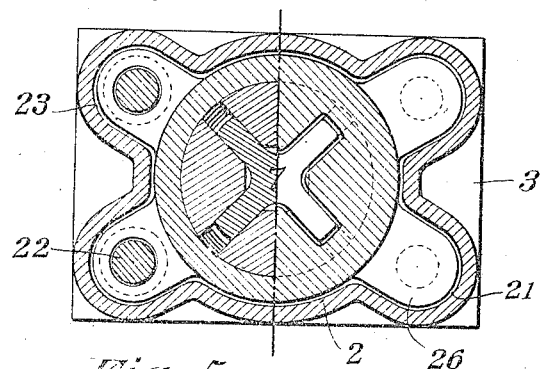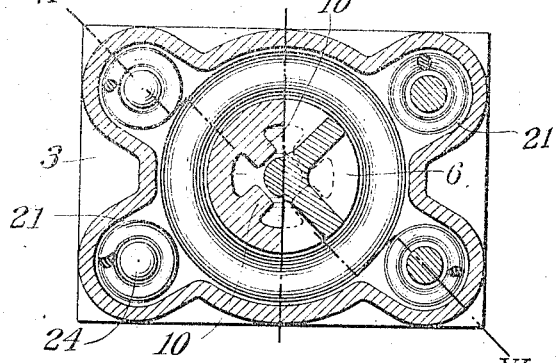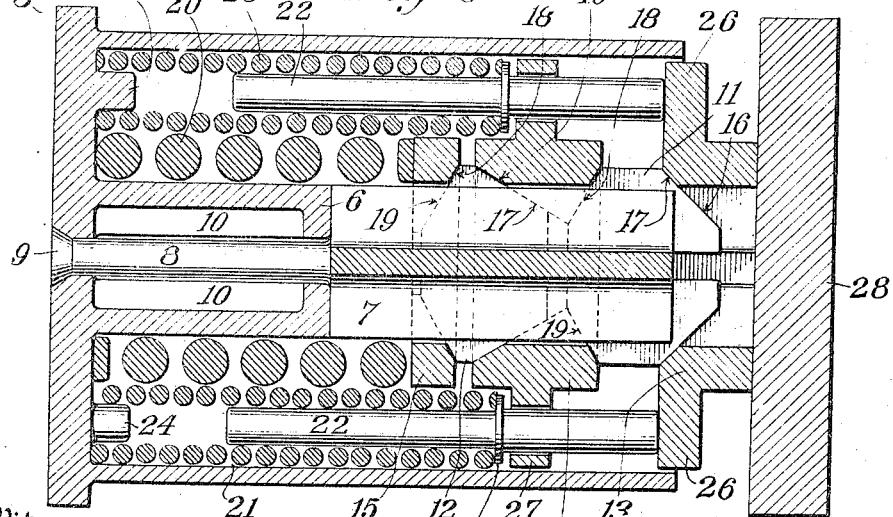

ERNEST H. SCHMIDT, OF CLEVELAND, OHIO, ASSIGNOR TO THE NATIONAL MALLEABLE CASTINGS COMPANY, OF CLEVELAND, OHIO.

FRICTION DRAFT-RIGGING.

1,192,571.     Specification of Letters Patent.     Patented July 25, 1916.

Application filed December 3, 1912, Serial No. 734,766. Renewed February 17, 1916. Serial No. 78,962.

*To all whom it may concern:*

Be it known that I, ERNEST H. SCHMIDT, a citizen of the United States, residing at Cleveland, Cuyahoga county, Ohio, have invented a new and Improved Friction Draft-Rigging, of which the following is a specification, reference being had to the accompanying drawings, in which—

Figure 1 is a plan partly in section of my improved rigging, showing its application to the frames of a car; Fig. 2 shows the rigging in section on lines II—II of Fig. 1; Fig. 3 is a detail of the central friction member; Fig. 4 is a section on broken lines IV—IV of Fig. 1; Fig. 5 is a section on broken lines V—V of Fig. 1, and Fig. 6 is a section on diagonal lines VI—VI of Fig. 5. Fig. 7 shows a modified form of the friction member.

My invention relates to friction draft rigging and provides a device in which the frictional elements are comprised of a plurality of friction shoes and a central friction member, and in which friction shoes are adapted to be wedged inwardly against the central member preferably by a plurality of wedge members, the friction shoes and wedge members being preferably arranged alternately and in tandem. My device is also designed to distribute the amount of frictional work done by the successive sets of frictional elements and to equalize the intensity of pressure upon the frictional surfaces of the said elements.

Referring to the drawings 2 indicates a follower preferably in the form of a case having a cylindrical bore, and an enlarged portion 3, preferably formed integrally therewith, which is rectangular in shape, and which is designed to abut against the draft sill stops 4, which are attached to the draft sills 5 of the car structure. Extending forwardly from the rear wall of the case and centrally located therein is a hollow abutment 6, upon which is positioned the central friction member 7, which is preferably cross-shaped in cross-section. The cross-shaped member 7 has a rearwardly extending portion 8, which is preferably secured to the abutment by upsetting the end 9 thereof. The forward end of the abutment 6 has supporting lips 10 which support the cross-pieces of the member 7. Between the cross-pieces of the member 7 are located sets of friction shoes or segments 11 and 12, each set being preferably comprised of four segments. The sets of segments 11 and 12 are held against the central friction member 7 by the wedging rings 13, 14 and the follower 15, and the wedges 13 and 14 have rearwardly and outwardly inclined wedging faces 16 which bear against corresponding wedging faces 17 of the segments. The forward faces 18 of the wedging ring 14 and follower 15 are angled at an angle corresponding to the angle of the rear faces 19 of the segments 11 and 12.

Arranged about the exterior of the abutment 6 is a compression spring 20 which abuts at its rear end against the case, and at its forward end against the follower 15. Within the case 2 and arranged about its bore are a plurality of pockets 21 in which are located the plungers 22 having springs 23 arranged thereon and centered at their rear ends upon projections 24 on the rear end of the casing and at their forward ends against shoulders 25 on the plungers 22. The forward ends of the plungers 22 are adapted to come in contact with the lugs 26 on the foremost wedge ring 13, and the shoulders 25 are adapted subsequently to come in contact with the lugs 27 on a succeeding wedge ring 14.

28 is a front follower bearing against the foremost wedge ring 13.

29 is the coupler-butt, and 30 are the forward draft sill stops secured to the draft sills 5.

The foremost set of segments 11 have wedging faces which are angled less acutely to the central friction member than the wedging faces of the succeeding set, and the bearing surfaces of each set are varied so as to be substantially in proportion to the total wedging or compressing action, which that set receives from the wedge ring arranged forwardly of it. The acuteness of the wedging angles, however, must not be carried to such an extent that there will be a failure to release the wedging faces after buffing or draft. By giving each set of segments and its coacting wedge ring wedging angles of the proper inclination with relation to the resistance to the rearward movement of that set, the wedging pressures of the segments near the spring are relatively increased and the pressures upon the outer segments relatively diminished, with the result that the amount of work done by the various sets, is more nearly equalized and the pressure is more evenly distributed throughout the frictional area of the central friction member. As the total compression force upon the forward set of segments is normally equal to, or greater than, the compression force upon any of the successive sets, even with the variation in the wedging angles above described, I overcome any such variation by giving to each set of segments a frictional bearing surface, which is substantially proportional to the total compression force it receives, so that for any given area of the compression member or segments bearing thereagainst, the pressure thereon is substantially uniform with other similar areas and the compressive pressures are distributed more evenly over the length of the frictional surfaces of the central friction member. Thus, as the wear is uniform upon the parts, the life of the parts of the rigging, and especially of the segments and the central friction member, is greatly increased.

The operation of my draft rigging is as follows: When the coupler receives a buffing shock, this shock is transmitted through the coupler-butt 29 and the front follower 28, to the foremost wedge ring 13, which may be integral with the front follower, and which is caused to move rearwardly and to enter the casing 2, the rear end of the casing being held from rearward movement relative to the car by the rear stops 4, which are attached to the draft sills 5. The wedge ring 13 transmits this pressure by an inward wedging action to the foremost set of segments 11, and this pressure is transmitted to the wedge ring 14, and from the wedge ring 14 to the succeeding set of segments 12, and from the segments 12 to the follower 15, and thence to the spring, and the entire series of wedges and segments is caused to move rearwardly within the casing as the wedge ring 13 enters the forward end of the casing. The rearward movement of the series of segmental rings is resisted by the compression spring 20, which bears at its rear end against the casing and at its forward end against the follower 15, and this resistance is transmitted successively through the follower 15, the segments 12, the wedge 14 and the segments 11, causing a powerful frictional engagement between the interior surfaces of the segments and the surfaces of the central friction member 7, thus exhausting the force of the buffing shock. By reason of the relatively blunt wedging angles of the foremost set of segments 11, this set does not do as great a proportion of the total frictional work as it would if the wedging angles of the sets were equal, and by reason of its relatively large area of frictional bearing surface against the friction member, the intensity of pressure thereon is considerably reduced. The succeeding set of segments 12, which has less pressure behind it to resist the rearward movement of the parts, has a more acute wedging angle than the foremost set, and each set has a frictional bearing area substantially proportional to the wedging pressure put upon it. Thus, by varying the area of the frictional bearing surface and the acuteness of the wedging angle, each set of segments does the desired amount of work, and the pressure exerted on the succeeding sets of segments and upon the frictional surfaces of the member is thus substantially equalized. The frictional engagement of the segments 11 and 12 and the surfaces of the central friction member increases progressively since, as the wedges and segments move rearwardly, the compression spring 20 bears with increasing pressure on the follower 15, and this pressure is transmitted thereby to the other parts.

When the rigging is under draft, the casing 2 will move forwardly and as the front follower 28 is held against forward movement by the draft sill stops 30, this forward action of the casing is resisted by the spring 20, which forces the follower 15 into engagement with the rearmost segments 12, and causes the same relative movement and progressively increasing frictional engagement between the segments and the central friction member as when the draft rigging is under buffing shock. After buffing or draft, the springs 23 drive forwardly the releasing plungers 22 and with them the foremost wedge ring 13 by its lugs 26, and the foremost wedge ring will carry with it the front follower 28. The shoulders 25 on the plungers 22 are preferably so arranged that, after the wedging engagement between the wedge ring 13 and the segments 11 has been released, they will strike the lugs 27 on the succeeding wedge ring 14 and will drive it forward thus giving a successive releasing action.

In Fig. 7 I have shown a modified form of the friction member 31 having three radially extending arms 32, and concave friction surfaces 33 between the arms 32, which is adapted for use with correspondingly shaped friction segments or shoes.

The use of a centrally located friction member against which the friction shoes bear, is of great advantage since it removes all bursting stresses from the casing and since the frictional pressures are concentrated upon the member uniformly, thus giving an equalized compression upon it at any given point.

It is obvious that in my device any desired number of sets of segments and of wedging rings may be used and that other variations may be made in the arrangement and construction of my device, without departing from my invention, since

What I claim is:

1. In frictional shock absorbing mechanism, a longitudinally-extending included friction member, a set of friction shoes arranged about said friction member and adapted to contact frictionally therewith, each shoe having a wedging face inclined in substantially the same direction as the wedging faces on the other shoes, wedging means co-acting with the wedging face of each shoe for wedging the shoes against the friction member, a compression spring, and a releasing spring coöperating with the wedging means to return the parts to normal position after buffing or draft.

2. In frictional shock absorbing mechanism, a friction member having a plurality of outwardly radiating arms, sets of friction shoes located between said arms, wedging members completely surrounding said friction member, said shoes and wedging members being arranged alternately and in tandem, and a compression spring.

3. In frictional shock absorbing mechanism, a centrally located friction member, friction segments bearing against the member, wedges engaging the friction segments, a compression spring, and means for releasing the wedging engagement between the friction segments and the wedges comprising spring and plunger mechanism.

4. In a frictional shock absorbing mechanism, a longitudinally movable case having therein a centrally located friction member, friction segments bearing against the member, wedges engaging the friction segments, a compression spring, pockets in the case containing mechanism for actuating the wedges to release the wedging engagement between the wedges and the friction segments.

5. In frictional shock absorbing mechanism, a friction member having a plurality of outwardly radiating arms forming with each other reëntrant angles, a plurality of friction shoes, each seating in a reëntrant angle, a wedge in engagement with said shoes, said wedge being in the form of a continuous ring completely encircling said friction member, and a compression spring.

6. In frictional shock absorbing mechanism, a longitudinally-arranged friction member of star shape in cross section, friction shoes seated against said friction member, a wedge ring completely encircling said friction member and in engagement with said shoes, a compression spring for causing progressive wedging engagement of said wedge and shoes, and additional spring means re-acting only against said wedge for releasing the wedging engagement.

7. In frictional shock absorbing mechanism, a friction member having at least three radially disposed and outwardly-extending arms, sets of friction shoes, one shoe of each set being seated between each adjacent pair of arms, wedge members in the form of rings completely encircling said friction member, in engagement with each set of shoes, and a compression spring.

8. In frictional shock absorbing mechanism, a friction member having a plurality of outwardly radiating arms, sets of friction shoes located between said arms, inexpansible wedging members capable of resisting outward pressure in contact with said friction shoes, said sets of shoes and wedges being arranged alternately and in tandem, and a compression spring, substantially as described.

9. In frictional shock absorbing mechanism, a centrally located or included friction member having radiating arms, sets of friction shoes seated between said arms, wedge members completely surrounding said included friction member, in wedging engagement with said sets of shoes and capable in themselves of sustaining outward pressure, said wedges and sets of shoes being arranged alternately and in tandem, a compression spring, and means for releasing the wedging action between said wedges and sets of shoes.

ERNEST H. SCHMIDT.

Witnesses:
HARRY E. ORR,
CHESTER K. BROOKS.